United States Patent
Sugiyama et al.

(10) Patent No.: US 8,208,073 B2
(45) Date of Patent: Jun. 26, 2012

(54) DISPLAY DEVICE, DISPLAY METHOD, SUPPLY DEVICE, SUPPLY METHOD, STORAGE MEDIUM, AND CONTROL SYSTEM FOR CONTROLLING THE DISPLAY OF INFORMATION PROVIDED FROM A SUPPLY DEVICE

(75) Inventors: Koichi Sugiyama, Kanagawa (JP); Dai Sato, Saitama (JP)

(73) Assignee: Sony Corporation, Tokyo (JP)

( * ) Notice: Subject to any disclaimer, the term of this patent is extended or adjusted under 35 U.S.C. 154(b) by 820 days.

(21) Appl. No.: 12/344,927

(22) Filed: Dec. 29, 2008

(65) Prior Publication Data

US 2009/0201423 A1    Aug. 13, 2009

(30) Foreign Application Priority Data

Feb. 8, 2008   (JP) ................................ 2008-028542

(51) Int. Cl.
*H04N 5/50* (2006.01)
*H04N 9/74* (2006.01)
*H04N 5/268* (2006.01)
*H04N 5/44* (2011.01)

(52) U.S. Cl. ......... 348/569; 348/588; 348/706; 348/734

(58) Field of Classification Search .................. 348/588, 348/565, 705, 706, 734, 564, 14.07, 14.09, 348/14.12; 725/151, 153, 37, 22; 386/353, 386/230, 231, 234; 710/15–19; 709/205, 709/248, 250

See application file for complete search history.

(56) References Cited

U.S. PATENT DOCUMENTS

| | | | |
|---|---|---|---|
| 6,243,645 B1 * | 6/2001 | Moteki et al. | 701/211 |
| 6,407,779 B1 * | 6/2002 | Herz | 348/734 |
| 7,176,957 B2 * | 2/2007 | Ivashin et al. | 348/14.09 |
| 7,222,356 B1 * | 5/2007 | Yonezawa et al. | 725/105 |
| 7,378,984 B2 | 5/2008 | Suzuki et al. | |
| 7,391,473 B2 * | 6/2008 | Takahashi | 348/561 |
| 7,394,499 B2 | 7/2008 | Okamoto et al. | |
| 7,468,738 B2 * | 12/2008 | Barreiro | 348/14.07 |
| 7,864,249 B2 * | 1/2011 | Kim | 348/564 |
| 2003/0142235 A1 * | 7/2003 | Ono | 348/554 |
| 2004/0145654 A1 * | 7/2004 | Motohashi | 348/14.02 |
| 2006/0041655 A1 * | 2/2006 | Holloway et al. | 709/223 |
| 2006/0098086 A1 * | 5/2006 | Chandra et al. | 348/14.07 |
| 2008/0046950 A1 | 2/2008 | Nakajima | |

FOREIGN PATENT DOCUMENTS

| | | |
|---|---|---|
| JP | 2004-208290 | 7/2004 |
| JP | 2008-48136 | 2/2008 |
| JP | 2008-271460 | 11/2008 |

* cited by examiner

*Primary Examiner* — Victor Kostak
(74) *Attorney, Agent, or Firm* — Oblon, Spivak, McClelland, Maier & Neustadt, L.L.P.

(57) ABSTRACT

A display device includes a display section configured to perform display and provided with a display screen; communicating sections configured to perform communication to receive pieces of content data from supply devices, respectively; and a controller configured to cause the received pieces of content data to be simultaneously displayed on corresponding divided areas of the display screen and to control the communicating sections to transmit, to the supply devices. The notification indicates that the pieces of content data are simultaneously displayed on the corresponding areas.

14 Claims, 7 Drawing Sheets

DISPLAY DEVICE, DISPLAY METHOD, SUPPLY DEVICE, SUPPLY METHOD, STORAGE MEDIUM, AND CONTROL SYSTEM FOR CONTROLLING THE DISPLAY OF INFORMATION PROVIDED FROM A SUPPLY DEVICE

CROSS REFERENCES TO RELATED APPLICATIONS

The present invention contains subject matter related to Japanese Patent Application JP 2008-028542 filed in the Japanese Patent Office on Feb. 8, 2008, the entire contents of which are incorporated herein by reference.

BACKGROUND OF THE INVENTION

1. Field of the Invention

The present invention relates to display devices, display methods, supply devices, supply methods, storage media, and control systems. In particular, the present invention relates to a display device, a display method, a supply device, a supply method, a storage medium, and a control system that are preferably used for a case in which multiple electronic devices for supplying content data are connected to a display-screen-equipped electronic device, such as a television receiver, through interfaces that communicate commands together with the content data.

2. Description of the Related Art

An HDMI (high-definition multimedia interface) standard is available as an interface standard for interconnecting digital home electronic equipment, such as a digital television receiver, a digital video camera, a digital video recorder, a digital player, a digital tuner, and a home-use game machine (e.g., refer to International Patent Publication No. WO2002/078336). Electronic equipment having a terminal that is compliant with the HDMI standard will hereinafter be referred to as an "HDMI device".

A terminal and an HDMI cable that are compliant with the HDMI standard have a CEC (consumer electronics control) line for communicating control signals, such as a command and a message, between HDMI devices connected through the HDMI cable, in addition to a line for transmitting AV data (e.g., refer to Japanese Unexamined Patent Application Publication No. 2004-208290).

A technology that uses the CEC line to communicate a control signal is available to allow an inter-device control function (hereinafter referred to as a "CEC function") to be realized between HDMI devices connected through an HDMI cable.

Figure 1:
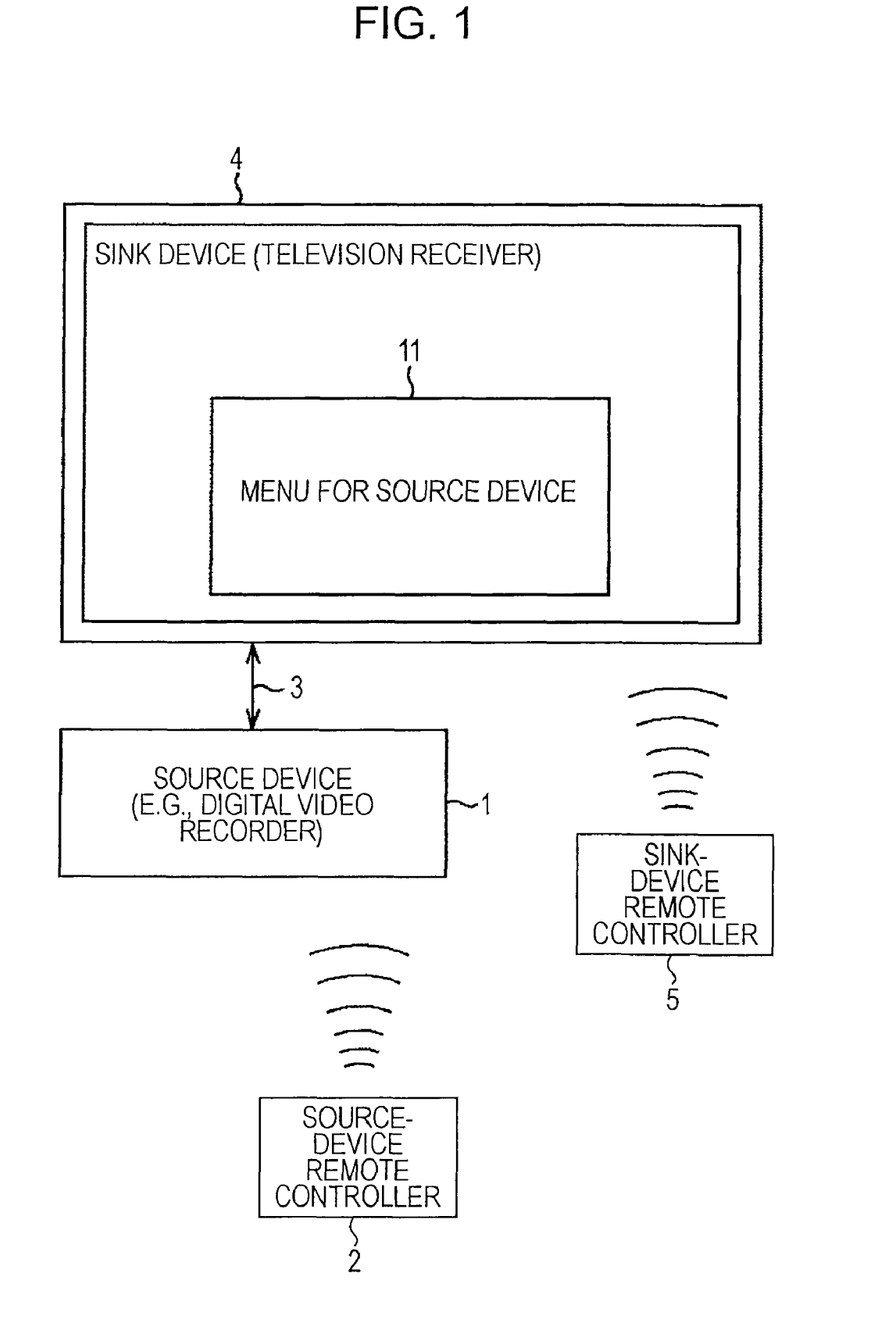
FIG. 1 is a block diagram showing a connection between a source device and a sink device.

In a system in which a source device 1 (e.g., a digital video recorder during playback) that serves as an HDMI device for supplying content data (such as AV data) and a sink device 4 (e.g., a television receiver) that serves as an HDMI device for outputting content data supplied from the source device 1 (i.e., for displaying video and outputting audio) are connected through an HDMI cable 3, as shown in FIG. 1, the CEC function is a function in which the source device 1 controls the operation of the sink device 4 and the sink device 4 controls the operation of the source device 1.

More specifically, for example, in the case of FIG. 1, through the use of "DeviceMenuControl" and "RemoteControlPassThrough" in the HDMI standard, the user can control the source device 1 by performing input operation using a sink-device remote controller 5 with respect to a menu 11 for the source device 1 (i.e., with respect to a representation corresponding to a video signal supplied from the source device 1), the menu 11 being displayed on a screen of the sink device 4. That is, an operation signal transmitted from the sink-device remote controller 5 is received by the sink device 4 and a command is transmitted from the sink device 4 to the source device 1 through the HDMI cable 3.

Needless to say, the user can control the source device 1 also by using a source-device remote controller 2. Similarly, the user can control the sink device 4 by using the sink-device remote controller 5.

SUMMARY OF THE INVENTION

As such a sink device 4, a television receiver that has multiple HDMIs and that allows video supplied from multiple input sources to be displayed on respective divided areas of a screen is available.

Figure 2:
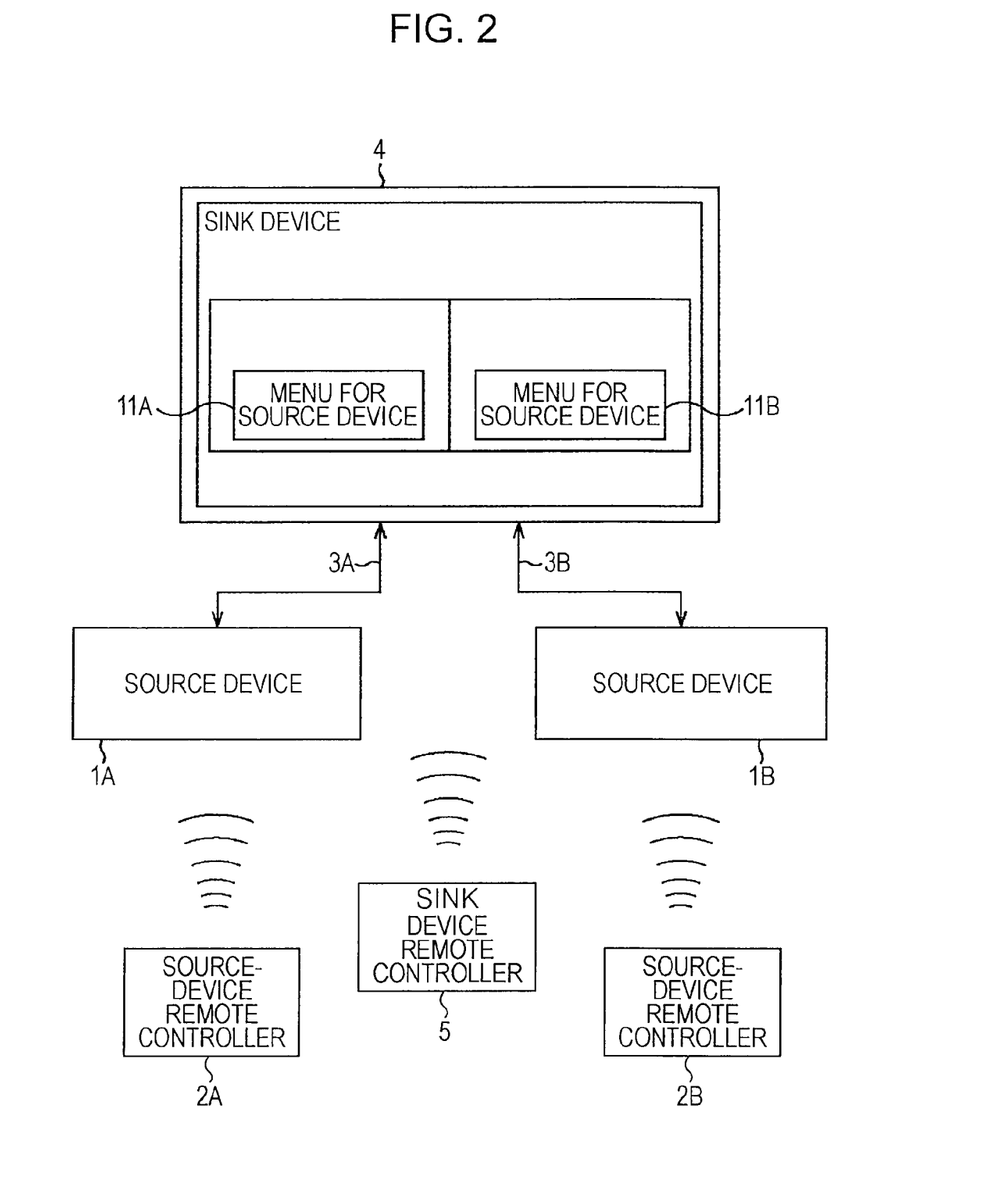
FIG. 2 is a block diagram showing an example displayed on a sink device to which multiple source devices are connected.

When the CEC function described above with reference to FIG. 1 is realized for such a television receiver that serves as the sink device 4, for example, when two source devices 1A and 1B are connected to a television receiver, as shown in FIG. 2, a menu 11A for the source device 1A connected through an HDMI 3A and a menu 11B for the source device 1B connected through an HDMI 3B may be simultaneously displayed.

With the multiple menus 11A and 11B for the respective source devices 1A and 1B being displayed on the screen of the sink device 4, when the user performs operation input by using a sink-device remote controller 5, it is difficult for him or her to promptly determine which one of the sink device 4, the source device 1A, and the source device 1B can be controlled, since the HDMI standard does not specify which of the multiple source devices 1A and 1B is to be controlled by priority. This can confuse the user during operation and can cause erroneous operation.

The present invention has been conceived in view of such a situation, and it is desirable to reduce confusion during user operation and to reduce erroneous operation when multiple source devices are connected to a sink device.

According to one embodiment of the present invention, there is provided a display device. The display device includes means for performing display, the means having a display screen; multiple means for performing communication to receive pieces of content data from supply devices, respectively; and means for causing the received pieces of content data to be simultaneously displayed on corresponding divided areas of the display screen and for controlling the multiple communicating means to transmit, to the supply devices, a notification indicating that the pieces of content data are simultaneously displayed on the corresponding areas.

When the pieces of content data are simultaneously displayed on the corresponding areas, the controlling means may control the multiple communicating means to transmit, to the supply devices, a command for suspending superimposition of a control representation on video data of the content data.

According to another embodiment of the present invention, there is provided a display method. The display method includes the steps of: receiving, using multiple means for performing communication, pieces of content data from supply devices, respectively; simultaneously displaying, on corresponding divided areas of a display screen of displaying means, the pieces of content data received in the receiving step; and transmitting a notification to the supply devices by using the multiple communicating means, the notification indicating that the pieces of content data are simultaneously displayed on the corresponding areas.

According to yet another embodiment of the present invention, there is provided a computer-readable storage medium. The storage medium stores a program for causing a computer to execute the steps of: receiving, using multiple means for performing communication, pieces of content data from supply devices, respectively; simultaneously displaying, on corresponding divided areas of a display screen of displaying means, the pieces of content data received in the receiving step; and transmitting a notification to the supply devices by controlling the multiple communicating means, the notification indicating that the pieces of content data are simultaneously displayed on the corresponding areas.

According to still another embodiment of the present invention, there is provided a supply device. The supply device includes means for generating content data; means for performing communication to transmit the content data; means for superimposing a control representation on video data of the content data; and means for controlling the superimposing means to suspend the superimposition of the control representation, on a basis of a notification that is transmitted from a display device having a display screen and that indicates that pieces of content data supplied from supply devices are simultaneously displayed on corresponding divided areas of the display screen.

According to a further embodiment of the present invention, there is provided a supply method. The supply method includes the steps of: generating content data; performing, using a communicating means, communication to transmit the content data; superimposing a control representation on video data of the content data; and performing control for suspending the superimposition of the control representation, on a basis of a notification that is transmitted from a display device having a display screen and that indicates that video of pieces of content data supplied from supply devices are simultaneously displayed on corresponding divided areas of the display screen.

According to a yet further embodiment of the present invention, there is provided a computer-readable storage medium. The storage medium stores a program for causing a computer to execute the steps of: generating content data; performing communication, using means for performing communication, to transmit the content data; superimposing a control representation on video data of the content data; and performing control for suspending the superimposition of the control representation, on a basis of a notification that is transmitted from a display device having a display screen and that indicates that video of pieces of content data supplied from supply devices are simultaneously displayed on corresponding divided areas of the display screen.

According to yet another embodiment of the present invention, there is provided a control system. The control system includes supply devices and a display device. Each supply device includes means for generating content data, means for performing communication to transmit the content data, and means for superimposing a control representation on video data of the content data. The display device includes means for performing display, the means having a display screen; multiple means for performing communication to receive pieces of content data from the supply devices, respectively; and means for causing the received pieces of content data to be simultaneously displayed on corresponding divided areas of the display screen and for controlling the multiple communicating means to transmit, to the supply devices, a notification indicating that the pieces of content data are simultaneously displayed on the corresponding areas. Each supply device further includes means for controlling the superimposing means to suspend the superimposition of the control representation, on a basis of the notification that is transmitted from the display device and that indicates that the pieces of content data are simultaneously displayed on the corresponding areas.

According to the embodiments of the present invention, it is possible to reduce confusion during user operation and to reduce erroneous operation when multiple source devices are connected to a sink device.

DESCRIPTION OF THE PREFERRED EMBODIMENT

A specific embodiment of the present invention will now be described in detail with reference to the accompanying drawings.

Figure 3:
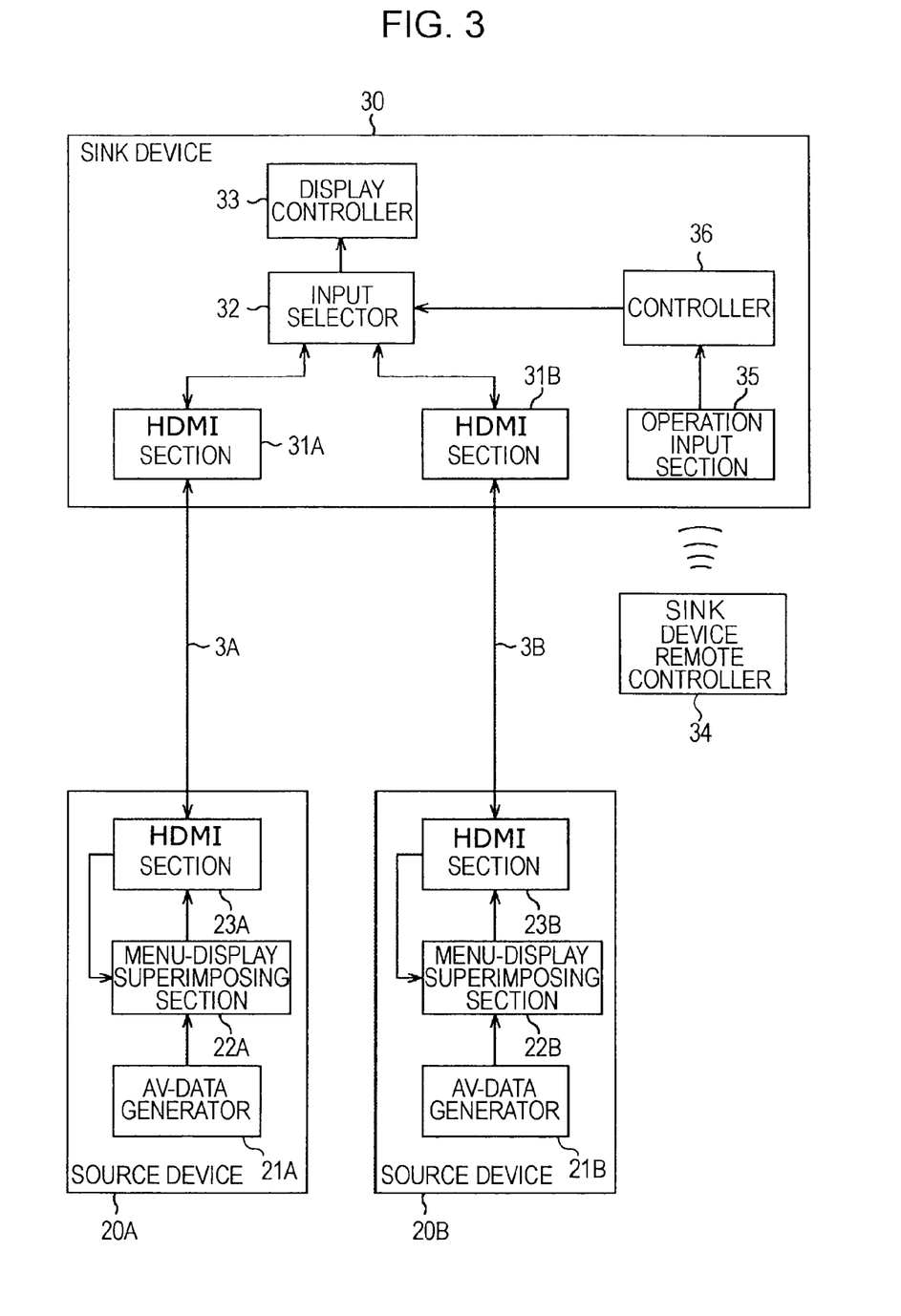
FIG. 3 is a block diagram showing an example of the configuration of a control system according to an embodiment of the present invention, the control system including source devices and a sink device.

FIG. 3 shows an example of the configuration of an electronic-device control system according to one embodiment of the present invention. The electronic-device control system includes source devices 20 (20A and 20B) and a sink device 30.

Examples of the source devices 20 include a digital video camera, a digital player, and a digital video recorder that serves as a playback device. The sink device 30 may be, for example, a television receiver equipped with a display section having a display screen.

In the electronic-device control system, the display screen (not shown) of the sink device 30 can be divided into two areas so that video of the source device 20A is displayed on one of the areas and video of the source device 20B is displayed on the other area. In this state, when multiple control representations (e.g., menus) for the source devices 20A and 20B are displayed as shown in FIG. 2, such a display state confuses the user during operation and can cause erroneous operation. In order to prevent such a state, the electronic-device control system according to the embodiment of the present invention is adapted so that multiple menus for the source devices 20A and 20B are not displayed on the display screen of the sink device 30.

In the electronic-device control system, two source devices 20A and 20B are connected to the sink device 30 through HDMI (high-definition multimedia interface) cables 3A and 3B, respectively. The source devices 20A and 20B are simply referred to as "source devices 20", unless differentiation should be made therebetween. The same applies to the HDMI cables 3A and 3B and so on.

Each source device 20 includes an AV data generator 21, a menu-display superimposing section 22, and an HDMI section 23. The AV-data generator 21 generates AV data to be supplied to the sink device 30. The menu-display superimposing section 22 superimposes a menu for the source device 20 on video data of the generated AV data. The HDMI section 23 supplies the generated AV data to the sink device 30 through the corresponding HDMI cable 3.

When the source device 20 is, for example, a digital video recorder, the AV-data generator 21 corresponds to a section that plays back AV data from a storage medium.

In accordance with control perfumed by the HDMI section 23, the menu-display superimposing section 22 superimposes a menu for the source device 20 on video data of AV data generated by the AV-data generator 21 or suspends the superimposition, and outputs the AV data to the subsequent HDMI section 23.

The HDMI section 23 transmits the AV data to a corresponding HDMI section 31 (31A or 31B) in the sink device 30 and also communicates a command for realizing the function of CEC between the source device 20 and the sink device 30.

The sink device 30 includes the HDMI sections 31A and 31B, an input selector 32, a display controller 33, a sink-device remote controller 34, an operation input section 35, and a controller 36. The HDMI section 31A is connected to the source device 20A through the HDMI cable 3A, and the HDMI section 31B is connected to the source device 20B through the HDMI cable 3B. The input selector 32 selects either or both of AV data supplied from the HDMI section 31A and AV data supplied from the HDMI section 31B, and outputs the selected AV data to the display controller 33. The display controller 33 displays, on the display screen, video corresponding to the AV data output from the input selector 32. The sink-device remote controller 34 transmits an operation signal in response to an operation input from the user. The operation input section 35 sends, to the controller 36, a control signal corresponding to the transmitted operation signal. In accordance with the control signal sent from the operation input section 35, the controller 36 controls the input selector 32.

In accordance with control that is performed by the controller 36 on the basis of the control signal sent from the operation input section 35, the input selector 32 outputs either or both of the AV data supplied from the HDMI section 31A and the AV data supplied from the HDMI section 31B. That is, when the user selects the source device 20A (which is connected to the HDMI section 31A) as an input device for the sink device 30, the AV data supplied from the HDMI section 31A is output to the display controller 33. On the other hand, when the user selects the source device 20B (which is connected to the HDMI section 31B) as an input device for the sink device 30, the AV data supplied from the HDMI section 31B is output to the display controller 33.

When the user selects two-screen display, both of the AV data supplied from the HDMI section 31A and the AV data supplied from the HDMI 31B are output to the display controller 33. In this case, the display controller 33 divides the display screen into two areas, causes video of the AV data supplied from the HDMI section 31A to be displayed on one area of the divided areas, and causes video of the AV data supplied from the HDMI section 31B to be displayed on the other area.

Commands communicated between the HDMI section 23 in the source device 20 and the HDMI section 31 in the sink device 30 include common commands standardized between manufacturers of HDMI devices and commands that are unique to each manufacturer.

The manufacturer-unique commands or messages communicated between the HDMI section 23 in the source device 20 in the embodiment of the present invention and the HDMI section 31 in the sink device 30 in the embodiment of the present invention include a display-state check request, a display-state check notification, a display-state change notification request, a display-state change notification, and a menu-display superimposition suspension request, which are described below.

The display-state check request is a command, issued from the source device 20 to the sink device 30, for requesting the sink device 30 to check whether or not the display state of the display screen is a one-screen display (undivided display) state or a divided display state and to transmit a notification indicating the display state to the source device 20.

The display-state check notification is a message that the sink device 30 transmits, in response to the display-state check request from the source device 20, to the source device 20 to indicate whether the display state of the display screen is the one-screen display (undivided display) state or the divided display state.

The display-state change notification request is a command that is issued from the source device 20 to the sink device 30 to request the sink device 30 to transmit, when the display state of the display screen is changed from the one-screen display (undivided display) state to the divided display state, a notification indicating the change.

The display-state change notification is a message that is issued, when the display state of the display screen is changed from the one-screen display (undivided display) state to the divided display state, from the source device 30 to the sink device 20 to indicate the change.

The menu-display superimposition suspension request is a command, transmitted from the sink device 30 to the source device 20, for requesting the superimposition of menu display on the video data of the AV data.

In order to prevent causing confusion during user operation and causing erroneous operation, the above-described three messages and two commands are appropriately combined to perform processing so that menus for multiple source devices are not displayed on the display screen of the sink device 40.

Four types of processing (hereinafter referred to as "first to fourth processing") will now be described.

Figure 4:
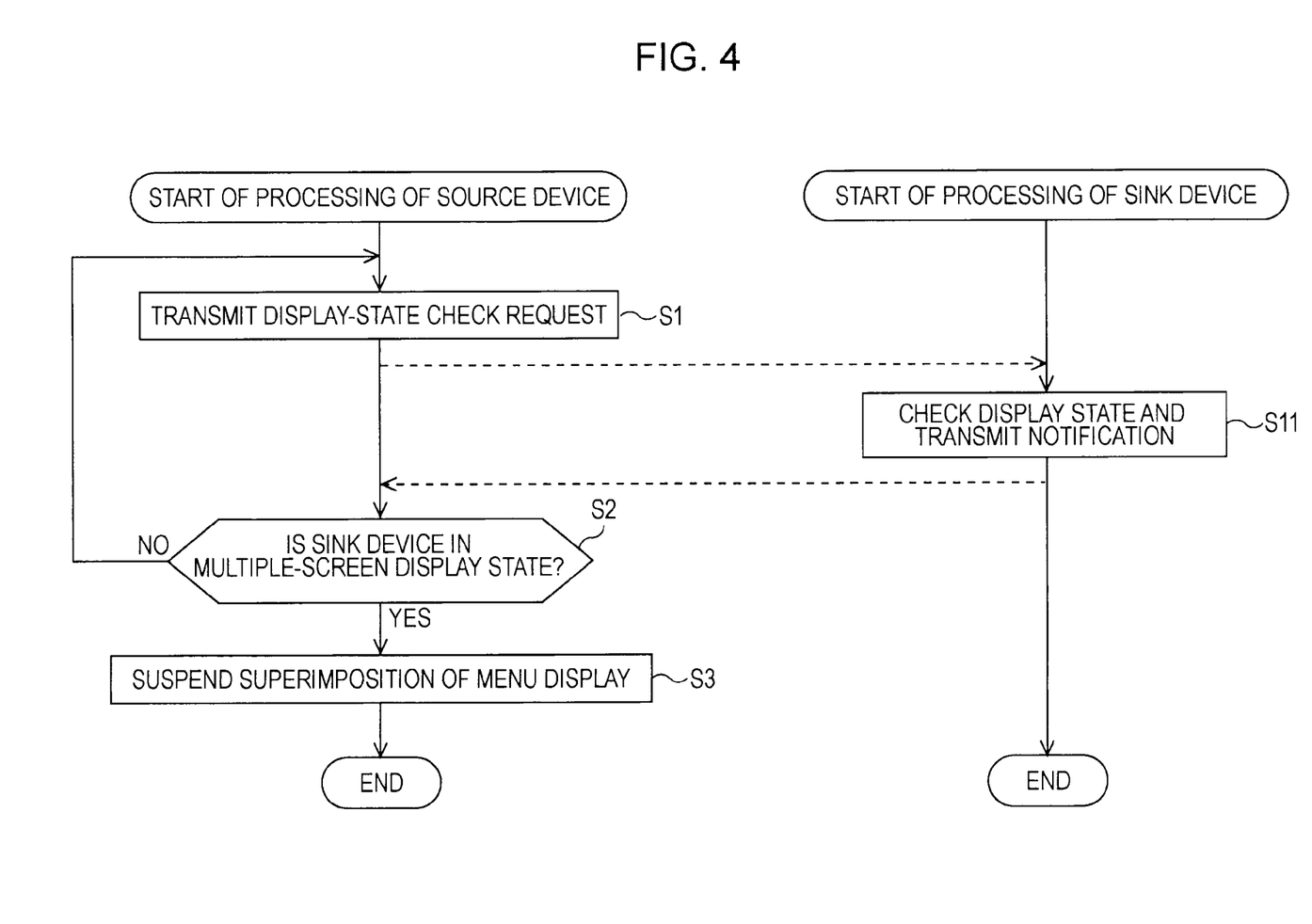
FIG. 4 is a flowchart illustrating first processing.

First, the first processing will be described with reference to a flowchart shown in FIG. 4. Each source device 20 initiates the first processing on the sink device 30. The first processing is started when the source device 20 starts displaying of a menu therefor in response to a predetermined operation transmitted from the user.

In step S1, the HDMI section 23 in the source device 20 transmits the display-state check request to the HDMI section 31 in the sink device 30 through the HDMI cable 3. In response to the display-state check request, the HDMI section 31 in the sink device 30 checks a display state with the input selector 32 in step S11. More specifically, the HDMI section 31 checks whether or not the display state of the display screen is a one-screen display (undivided display) state or a divided display state and transmits the display-state check notification to the HDMI section 23 in the source device 20 through the HDMI cable 3, the display-state check notification indicating whether or not the display state of the display screen is the one-screen display (undivided display) state or the divided display state.

In response to the display-state check notification, in step S2, the HDMI section 23 in the source device 20 determines whether or not the display state of the display screen of the sink device 30 is the one-screen display (undivided display) state or the divided display state. Upon determining that the display state is the divided display state, the process proceeds to step S3. In step S3, the menu-display superimposing section 22 suspends superimposition of menu display for the source device 20 on the video data of the AV data supplied from the AV-data generator 21, in accordance with control performed via the HDMI section 23. The first processing then ends.

Conversely, when it is determined in step S2 that the display state of the display screen of the sink device 30 is the one-screen display (undivided display) state, the process returns to step S1 and the processing subsequent thereto is repeated.

According to the above-described first processing, when the display screen of the sink device 30 is put into the divided display state, the source device 20 suspends the superimposition of menu display. This arrangement, therefore, can prevent causing confusion during an operation and causing erroneous operation which are due to a state in which multiple menus for source devices are displayed on a screen.

Figure 5:
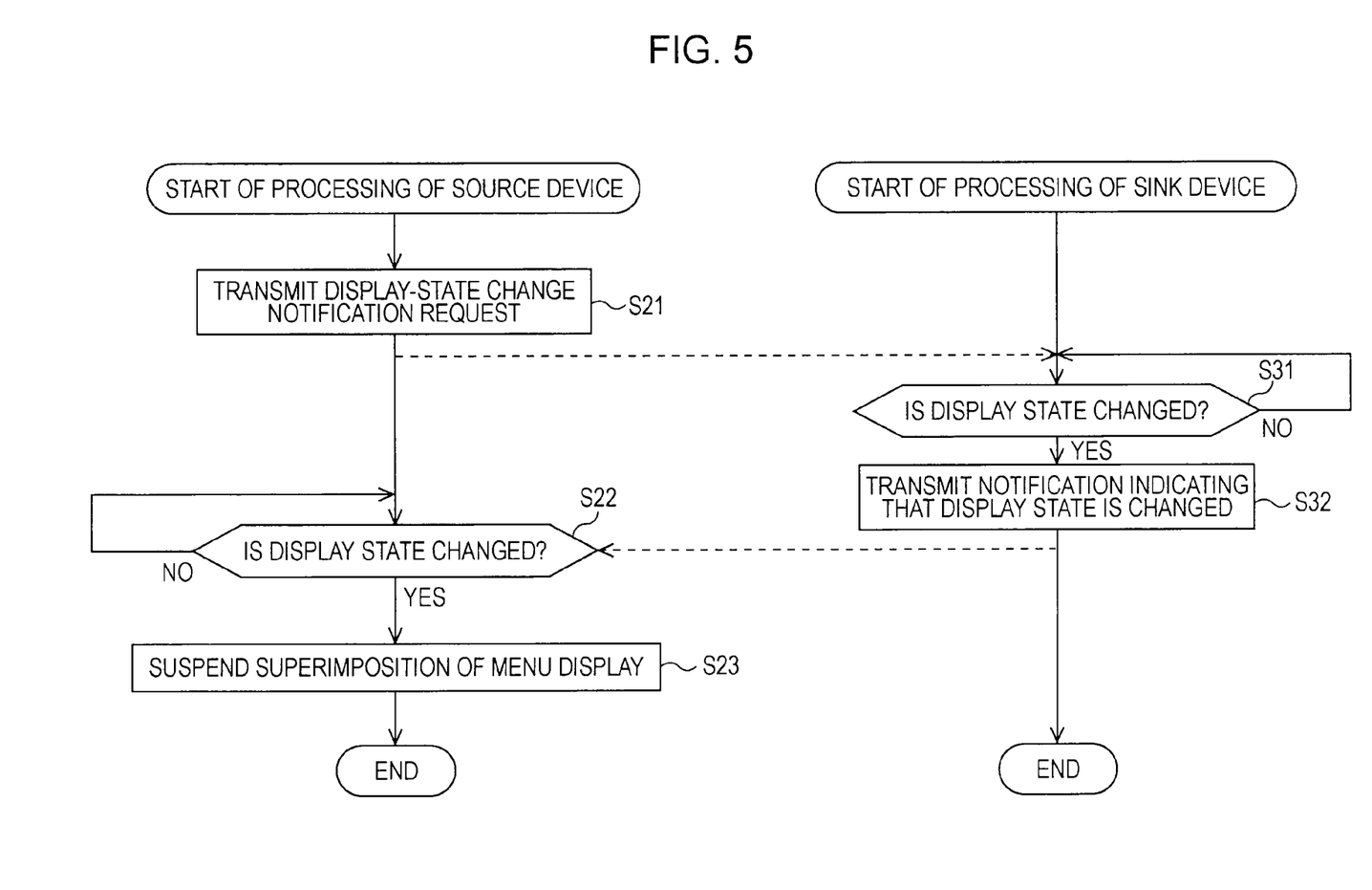
FIG. 5 is a flowchart illustrating second processing.

Next, the second processing will be described with reference to a flowchart shown in FIG. 5. Each source device 20 initiates the second processing on the sink device 30. The second processing is started when the source device 20 starts displaying of a menu therefor in response to a predetermined operation transmitted from the user.

In step S21, the HDMI section 23 in the source device 20 transmits the display-state change notification request to the HDMI section 31 in the sink device 30 through the HDMI cable 3. In response to the display-state change notification request, in step S31, the HDMI section 31 in the sink device 30 checks the display state with the input selector 32. More specifically, the HDMI section 31 checks whether or not the display state of the display screen is the one-screen display (undivided display) state or the divided display state, and stands by until the display state is changed. When the display state of the display screen is changed, specifically, when the display state is changed from the one-screen display (undivided display) state to the divided display state, the process proceeds to step S32. In step S32, the HDMI section 31 in the sink device 30 transmits the display-state change notification to the HDMI section 23 in the source device 20 through the HDMI cable 3, the display-state change notification indicating that the display state of the display screen is changed.

On the other hand, after transmitting the display-state change notification request in the processing in step S21, the HDMI section 23 in the source device 20 stands by in step S22 until the display state of the sink device 30 is changed (in practice, stands by until the HDMI section 23 receives the display-state change notification transmitted from the HDMI section 31 in the sink device 30). When the HDMI section 23 in the source device 20 receives the display-state change notification transmitted from the HDMI section 31 in the sink device 30, the process proceeds to step S23.

In step S23, the menu-display superimposing section 22 suspends superimposition of menu display for the source device 20 on the video data of the AV data from the AV-data generator 21. The second processing then ends.

According to the above-describe second processing, when the display screen of the sink device 30 is put into the divided display state, each source device 20 suspends the superimposition of menu display. This arrangement, therefore, can prevent causing confusion during user operation and causing erroneous operation which are due to a state in which multiple menus for source devices are displayed on the screen.

Figure 6:
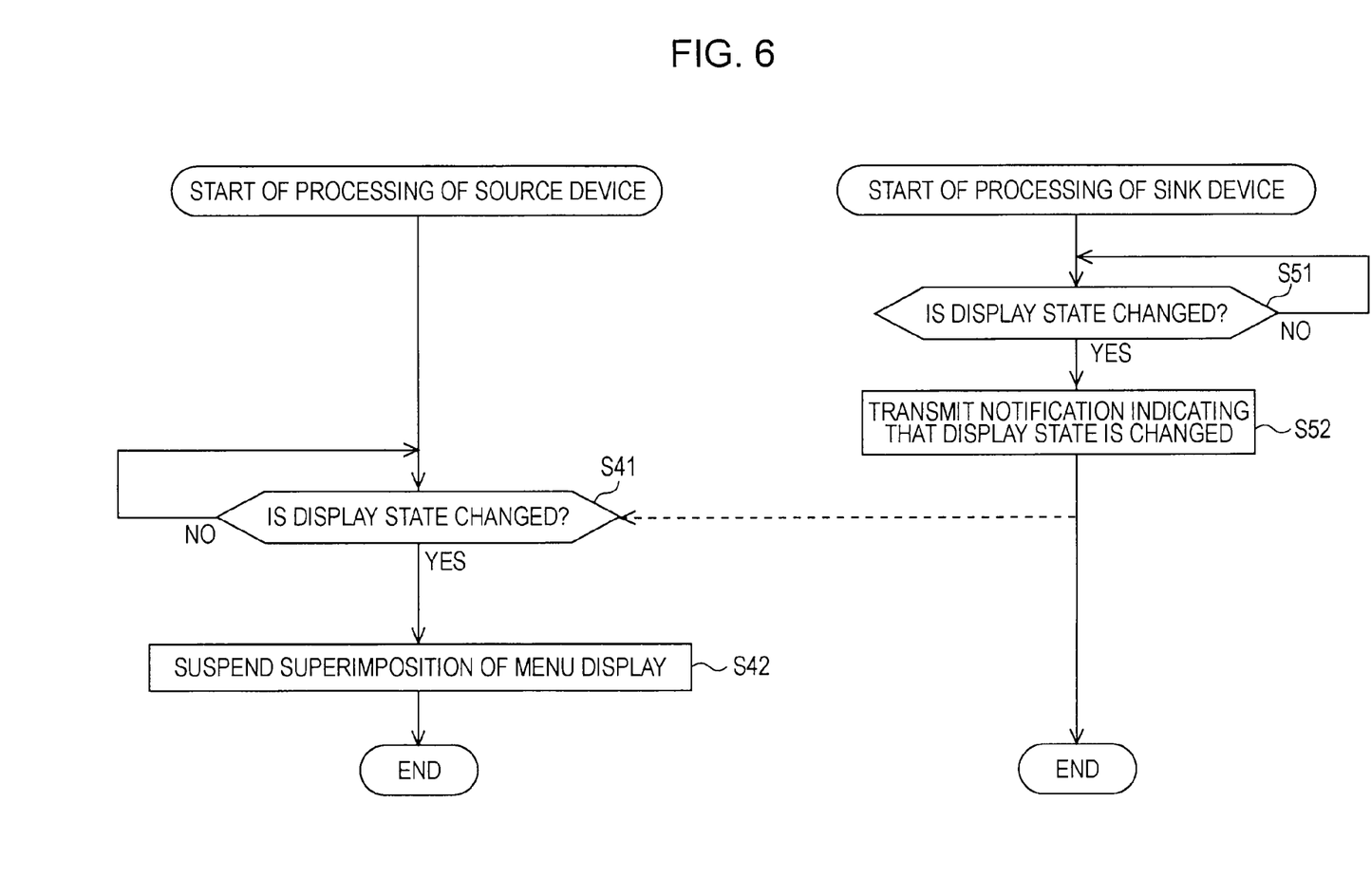
FIG. 6 is a flowchart illustrating third processing.

Next, the third processing will be described with reference to a flowchart shown in FIG. 6. The HDMI sections 31A and 31B in the sink device 30 manly initiate the third processing on the corresponding source devices 20 connected thereto. The third processing is started when AV data from the source device 20 is received via the HDMI section 31.

In step S51, the HDMI section 31 in the sink device 30 checks the display state with the input selector 32. More specifically, the HDMI section 31 checks whether or not the display state of the display screen is the one-screen display (undivided display) state or the divided display state, and stands by until the display state is changed. When the display state of the display screen is changed, specifically, when the display state is changed from the one-screen display (undivided display) state to the divided display state, the process proceeds to step S52. In step S52, the HDMI section 31 in the sink device 30 transmits the display-state change notification to the HDMI section 23 in the source device 20 through the HDMI cable 3, the display-state change notification indicating that the display state of the display screen is changed.

On the other hand, the HDMI section 23 in the source device 20 stands by in step S41 until the display state of the sink device 30 is changed (in practice, stands by until the HDMI section 23 receives the display-state change notification transmitted from the HDMI section 31 in the sink device 30). When the HDMI section 23 in the source device 20 receives the display-state change notification transmitted from the HDMI section 31 in the sink device 30, the process proceeds to step S42.

When the menu for the source device 20 is displayed superimposed on the video data of the AV data from the AV-data generator 21, in step S42, the menu-display superimposing section 22 suspends the superimposition, in accordance with control performed by the HDMI section 23. The third processing then ends.

According to the above-described third processing, when the display screen of the sink device 30 is put into the divided display state, the source device 20 suspends the superimposition of menu display. This arrangement, therefore, can prevent causing confusion during user operation and causing erroneous operation which are due to a state in which multiple menus for source devices are displayed on the screen.

Figure 7:
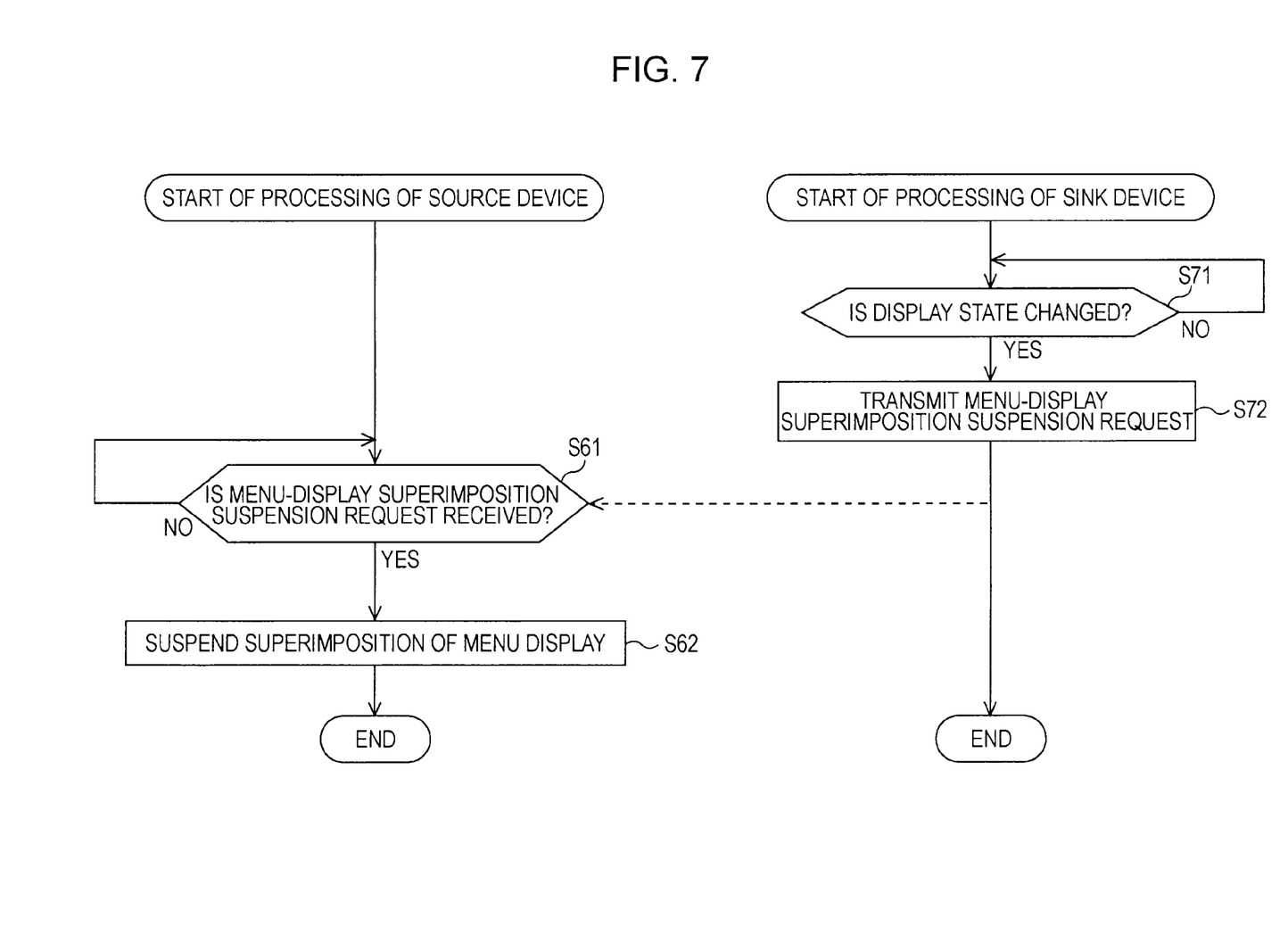
FIG. 7 is a flowchart illustrating fourth processing.

Next, the fourth processing will be described with reference to a flowchart shown in FIG. 7. The HDMI sections 31A and 31B in the sink device 30 initiate the fourth processing on the source devices 20 connected thereto. The fourth processing is started when AV data from the source device 20 is received via the HDMI section 31.

In step S71, the HDMI section 31 in the sink device 30 checks the display state with the input selector 32. More specifically, the HDMI section 31 checks whether or not the display state of the display screen is the one-screen display (undivided display) state or the divided display state, and stands by until the display state is changed. When the display state of the display screen is changed, specifically, when the display state is changed from the one-screen display (undivided display) state to the divided display state, the process proceeds to step S72. In step S72, the HDMI section 31 in the sink device 30 transmits the menu-display superimposition suspension request to the HDMI section 23 in the source device 20 through the HDMI cable 3.

On the other hand, in step S61, the HDMI section 23 in each source device 20 stands by until it receives the menu-display superimposition suspension request transmitted from the HDMI section 31 in the sink device 30. When the HDMI section 23 in the source device 20 receives the menu-display superimposition suspension request transmitted from the HDMI section 31 in the sink device 30, the process proceeds to step S62.

In step S62, when the menu for the source device 20 is displayed superimposed on the video data of the AV data from the AV-data generator 21, the menu-display superimposing section 22 suspends the superimposition in accordance with control performed by the HDMI section 23. The fourth processing then ends.

In the above-described fourth processing, when the display screen of the sink device 30 is put into the divided display state, each source device 20 suspends the superimposition of menu display. This arrangement, therefore, can prevent causing confusion during user operation and causing erroneous operation which are due to a state in which multiple menus for source devices are displayed on the screen.

As described above, during execution of any of the first to fourth processing, when the display screen of the sink device 30 is put into the divided display state, the source device 20 suspends the superimposition of menu display. This arrangement, therefore, can prevent causing confusion during user operation and causing erroneous operation which are due to a state in which multiple menus for source devices are displayed on the screen.

According to the first to fourth processing, the superimposed displayed menu for the source device disappears from all divided areas on the display screen of the sink device 30. For example, the arrangement may be such that a divided area specified by the user or a menu for the source device specified by the user is left displayed and the other divided area(s) or the menu(s) for the other source device(s) is caused to disappear. Instead of causing the menu for the source device to disappear, for example, the menu may be grayed out by reducing the brightness, color saturation, and so on during the display superimposition.

Although the number of source devices 20 is two and the number of HDMI sections 31 in the sink device 30 is two in the present embodiment, the present invention is not limited thereto and the number may be three or more. The number of divided screens on the sink device 30 may also be three or more. The present invention is applicable to not only a case in which the display screen is divided but also a case in which video of multiple source devices 20 are displayed on a screen, such as a case of picture-in-picture.

The present invention is also applicable to a case in which a representation for control, other than a menu, is superimposed on the video data of AV data.

The present invention is applicable to not only an electronic device having an HDMI but also an electronic device having an interface that can communicate a command and/or a message together with AV data or the like.

The above-described series of processing can be executed by hardware or software.

The term "system" herein refers to entire equipment including multiple devices.

The present invention is not limited to the above-described embodiment, and various changes can be made thereto without departing from the spirit and scope of the present invention.

It should be understood by those skilled in the art that various modifications, combinations, sub-combinations and alterations may occur depending on design requirements and other factors insofar as they are within the scope of the appended claims or the equivalents thereof.

What is claimed is:

1. A display device comprising:
   means for performing display, the means having a display screen;
   multiple means for performing communication to receive pieces of content data from supply devices, respectively; and
   means for causing the received pieces of content data to be simultaneously displayed on corresponding divided areas of the display screen and for controlling the multiple communicating means to transmit, to the supply devices, a command for suspending superimposition of a control representation on video data of the content data.

2. A display method comprising the steps of:
   receiving, using multiple means for performing communication, pieces of content data from supply devices, respectively;
   simultaneously displaying, on corresponding divided areas of a display screen of displaying means, the pieces of content data received in the receiving step; and
   transmitting a command to the supply devices by using the multiple communicating means, the command for suspending superimposition of a control representation on video of the content data.

3. A non-transitory computer-readable storage medium that stores a program for causing a computer to execute the steps of:
   receiving, using multiple means for performing communication, pieces of content data from supply devices, respectively;
   simultaneously displaying, on corresponding divided areas of a display screen of displaying means, the pieces of content data received in the receiving step; and
   transmitting a command to the supply devices by controlling the multiple communicating means, the command for suspending superimposition of a control representation on video data of the content data.

4. A supply device comprising:
   means for generating content data;
   means for performing communication to transmit the content data;
   means for superimposing a control representation on video data of the content data; and
   means for controlling the superimposing means to suspend the superimposition of the control representation, on a basis of a notification that is transmitted from a display device having a display screen and that indicates that pieces of content data supplied from supply devices are simultaneously displayed on corresponding divided areas of the display screen.

5. A supply method comprising the steps of:
   generating content data;
   performing, using a communicating means, communication to transmit the content data;
   superimposing a control representation on video data of the content data; and
   performing control for suspending the superimposition of the control representation, on a basis of a notification that is transmitted from a display device having a display screen and that indicates that video of pieces of content data supplied from supply devices are simultaneously displayed on corresponding divided areas of the display screen.

6. A non-transitory computer-readable storage medium that stores a program for causing a computer to execute the steps of:
   generating content data;
   performing communication, using means for performing communication, to transmit the content data;
   superimposing a control representation on video data of the content data; and
   performing control for suspending the superimposition of the control representation, on a basis of a notification that is transmitted from a display device having a display screen and that indicates that video of pieces of content data supplied from supply devices are simultaneously displayed on corresponding divided areas of the display screen.

7. A control system comprising:
supply devices, each including
means for generating content data,
means for performing communication to transmit the content data, and
means for superimposing a control representation on video data of the content data; and
a display device including
means for performing display, the means having a display screen,
multiple means for performing communication to receive pieces of content data from the supply devices, respectively, and
means for causing the received pieces of content data to be simultaneously displayed on corresponding divided areas of the display screen and for controlling the multiple communicating means of the display device to transmit, to the supply devices, a notification indicating that the pieces of content data are simultaneously displayed on the corresponding areas;
wherein each supply device further includes means for controlling the superimposing means to suspend the superimposition of the control representation, on a basis of the notification that is transmitted from the display device and that indicates that the pieces of content data are simultaneously displayed on the corresponding areas.

8. A display device comprising:
a display section configured to perform display, the display section having a display screen;
communicating sections configured to perform communication to receive pieces of content data from supply devices, respectively; and
a controller configured to cause the received pieces of content data to be simultaneously displayed on corresponding divided areas of the display screen and to control the communicating sections to transmit, to the supply devices, a command for suspending superimposition of a control representation on video data of the content data.

9. A display method comprising the steps of:
receiving, using communicating sections, pieces of content data from supply devices, respectively;
simultaneously displaying, on corresponding divided areas of a display screen of a display section, the pieces of content data received in the receiving step; and
transmitting a command to the supply devices by using the multiple communicating sections, the command for suspending superimposition of a control representation on video data of the content data.

10. A non-transitory computer-readable storage medium that stores a program for causing a computer to execute the steps of:
receiving, using communicating sections, pieces of content data from supply devices, respectively;
simultaneously displaying, on corresponding divided areas of a display screen of a display section, the pieces of content data received in the receiving step; and
transmitting a command to the supply devices by controlling the multiple communicating sections, the command for suspending superimposition of a control representation on video data of the content data.

11. A supply device comprising:
a generator configured to generate content data;
a communicating section configured to perform communication to transmit the content data;
a superimposing section configured to superimpose a control representation on video data of the content data; and
a controller configured to control the superimposing section to suspend the superimposition of the control representation, on a basis of a notification that is transmitted from a display device having a display screen and that indicates that pieces of content data supplied from supply devices are simultaneously displayed on corresponding divided areas of the display screen.

12. A supply method comprising the steps of:
generating content data;
performing, using a communicating section, communication to transmit the content data;
superimposing a control representation on video data of the content data; and
performing control for suspending the superimposition of the control representation, on a basis of a notification that is transmitted from a display device having a display screen and that indicates that video of pieces of content data supplied from supply devices are simultaneously displayed on corresponding divided areas of the display screen.

13. A non-transitory computer-readable storage medium that stores a program for causing a computer to execute the steps of:
generating content data;
performing communication, using a communicating section, to transmit the content data;
superimposing a control representation on video data of the content data; and
performing control for suspending the superimposition of the control representation, on a basis of a notification that is transmitted from a display device having a display screen and that indicates that video of pieces of content data supplied from supply devices are simultaneously displayed on corresponding divided areas of the display screen.

14. A control system comprising:
supply devices, each including
a generator configured to generate content data,
a communicating section configured to perform communication to transmit the content data, and
a superimposing section configured to superimpose a control representation on video data of the content data; and
a display device including
a display section having a display screen,
communicating sections configured to perform communication to receive pieces of content data from the supply devices, respectively, and
a controller configured to cause the received pieces of content data to be simultaneously displayed on corresponding divided areas of the display screen and to control the communicating sections of the display device to transmit, to the supply devices, a notification indicating that the pieces of content data are simultaneously displayed on the corresponding areas;
wherein each supply device further includes a controller configured to control the superimposing section to suspend the superimposition of the control representation, on a basis of the notification that is transmitted from the display device and that indicates that the pieces of content data are simultaneously displayed on the corresponding areas.

* * * * *